United States Patent
Ragaly et al.

[11] Patent Number: 6,013,967
[45] Date of Patent: Jan. 11, 2000

[54] SYNCHRONOUS MACHINE, IN PARTICULAR GENERATOR FOR MOTOR VEHICLE

[75] Inventors: Istvan Ragaly, Schwieberdingen; Juergen Lechner, Eberdingen-Nussdorf; Alexander Shendi, Asperg; Hans-Peter Groeter, Vaihingen, all of Germany; Sylvain Briand; Alan Syrop, both of Cardiff, United Kingdom

[73] Assignee: Robert Bosch GmbH, Stuttgart, Germany

[21] Appl. No.: 09/237,306

[22] Filed: Jan. 26, 1999

[30] Foreign Application Priority Data

Jan. 26, 1998 [DE] Germany ............... 198 02 785

[51] Int. Cl.⁷ ................................................. H02K 1/22
[52] U.S. Cl. ...................... 310/263; 310/181; 310/264; 310/156; 310/45; 310/51; 310/268; 310/261
[58] Field of Search ....................... 310/263, 181, 310/264, 156, 45, 268, 51, 261

[56] References Cited

U.S. PATENT DOCUMENTS

| | | | |
|---|---|---|---|
| 5,519,277 | 5/1996 | York et al. | 310/263 |
| 5,539,265 | 7/1996 | Harris et al. | 310/263 |
| 5,543,676 | 8/1996 | York et al. | 310/263 |
| 5,578,885 | 11/1996 | Alford et al. | 310/263 |
| 5,747,913 | 5/1998 | Amlee et al. | 310/263 |
| 5,793,144 | 8/1998 | Kusase et al. | 310/263 |
| 5,828,155 | 10/1998 | Adachi | 310/263 |
| 5,892,313 | 4/1999 | Harris et al. | 310/263 |

FOREIGN PATENT DOCUMENTS

| | | |
|---|---|---|
| 89 05 353 | 4/1990 | Germany . |
| 2 281 665 | 3/1995 | United Kingdom . |

*Primary Examiner*—Nestor Ramirez
*Assistant Examiner*—Thanh Lam
*Attorney, Agent, or Firm*—Michael J. Striker

[57] ABSTRACT

A synchronous machine, in particular a generator for a vehicle, has an excitation system with a plurality of electrically excited individual poles in a rotor, preferably in form of claw poles excited by at least one common excitation coil, in which for compensation of a magnetic stray flux, in the free spaces between the axially oriented claw poles permanent magnets are inserted at the axial ends of the pole plates of the rotor, so that the permanent magnets are supported by a holder against centrifugal forces and held by it, and therefore an especially simple and inexpensive holder is formed which considerably simplifies and facilitates the insertion of the permanent magnets.

36 Claims, 4 Drawing Sheets

SYNCHRONOUS MACHINE, IN PARTICULAR GENERATOR FOR MOTOR VEHICLE

BACKGROUND OF THE INVENTION

The present invention relates to a synchronous machine, in particular a generator for a motor vehicle.

More particularly, it relates to a synchronous machine which has an excitation system composed of a plurality of electrically excited individual poles in a rotor, for example in form of claw poles excited by at least one common excitation coil, in which for compensation of the magnetic stray flux, in the free spaces between the claw poles oriented axially toward one another, permanent magnets are introduced on pole plates mounted on the axial ends of the rotor, which are supported against centrifugal forces and held by a holder.

Synchronous machines of this type are known in the art. One of such machines is disclosed for example in the German patent document DE 89 05 353 U1. In this machine the permanent magnets located in the free spaces between the oppositely located claw poles are oriented by holding plates against the centrifugal forces and magnetized so that they counteract the stray flux. The holding plates are inserted at the peripheral side in widening of the claw poles and fixed, while they are supported at the side facing the central axis of the machine on a non magnetic sleeve which surrounds the excitation stage. This construction of the permanent magnets requires not only substantial expenses for the parts which depend on the number of poles on the synchronous machines, but also requires a substantial mounting expense for the holding plates. The rotor of the synchronous machine is therefore expensive to manufacture. Moreover, the permanent magnets are not clearly oriented in the axial direction against the axial blow forces.

As shown in U.S. Pat. No. 5,543,676 it is known to insert the U-shaped permanent magnet between the excitation coil and the claw pole, so that the side legs of the permanent magnets are introduced in the free spaces between the claw poles. These permanent magnets extend only to the axial center of the free spaces, since a permanent magnet is inserted from each tip of a claw pole.

Also, a meandering and ring-shaped holder for the permanent magnets is known, which is prefabricated as a unit and during the mounting of the rotor on the pole core is fitted with the excitation winding, before the pole plates are mounted from both axial ends with their claw poles. The claw poles are introduced in the axially open receptacles of the holder as shown in the patent document UK 2 281 665 A. This known holder has a complicated construction and is expensive to manufacture. Moreover, the permanent magnets and the holder itself are not clearly secured against the centrifugal forces and axial blow forces.

SUMMARY OF THE INVENTION

Accordingly, is an object of present invention to provide a synchronous machine of the above mentioned general type which avoids the disadvantages of the prior art.

More particularly, it is an object of present invention to provide a holder for permanent magnets for a synchronous machine, which has simple construction and is easy and inexpensive to manufacture and is radially and axially accurately fixable during the mounting of the rotor.

In keeping with these objects and with others which will become apparent hereinafter, one feature of present invention resides, briefly stated, in a synchronous machine, in which the holder is composed of two holding disks which are mounted on the axial ends of the excitation system at the outer sides of the pole plates and inserted with the formed and bent holding strips alternatingly into the intermediate spaces between the claw poles, the holding strips hold the permanent magnets and support the permanent magnets against centrifugal forces, they extend over the total axial direction of the excitation system and are held on the neighboring claw poles, and also the holder can be formed of two holding sleeves which are arranged under the pole plates associated with the claw poles and inserted with the formed, bent holding strips into the free spaces between the claw poles and the holding strips support the permanent magnets against centrifugal forces and the holding strips are held on the neighboring claw poles.

The holding disks or the holding sleeves are prefabricated with the permanent magnets mounted on the holding strips and connected with the pole plates before they are mounted on the pre-mounted excitation system. The holder is composed of two simple parts which can be produced as stamped bending parts easy and inexpensively.

In accordance with one solution, the holding disks are inserted from the outer sides of the pole plates, and the holding strips can be fixed at a side of the claw pole in abutting manner. The thusly prefabricated units can be fitted on both axial ends of the excitation system, and the claw pole of both plates with the holding strips abutting at one side with the permanent magnets are nested in one another, independently on whether the free spaces extend parallel to the central axis of the machine or inclined relative to one another in the claw angle.

In accordance with a second solution, the holding sleeves are inserted from the pole side under the claw poles of the associated pole plates and fixed. The thusly prefabricated units composed of pole plates and holding sleeves with permanent magnets can be in the same manner fitted from the axial ends on the prefabricated excitation system. The axial fixing can be performed in a known manner, for example in the rotor shaft. In the inventive construction, two simple stamped bending parts are needed for the holding, which accurately support the permanent magnets against centrifugal forces without making difficult the mounting of the rotor. The premounting of the pole plates of the holding disks of the holding sleeves makes possible integration in the manufacturing process of the rotor in a simple manner.

In accordance with a further embodiment of the present invention, the number of the holding strips corresponding to the half number of poles extends on the holding disks parallel to one another or inclined in the same direction, and makes possible the solution with the holding disks both in the free spaces which extend parallel to the central axis of the machine and also with claw poles with claw angle and inclined free spaces.

The solution with the holding sleeves can be designed so that the holding strips alternatingly are formed on one or the other holding sleeve and bent, and extend over the total axial sides of the free space. The holding strips can extend parallel to the axis of the machine or inclined to it. On the other hand, the holding strips can be formed and bent on the holding sleeves as pairs inclined at the claw angle. They can extend substantially to the axial center of the excitation system and inserted in all pairs of the free spaces to abut against one another in the region of the facing axial ends of the excitation system.

The radial securing of the holding strips on the claw poles can be formed in accordance with one embodiment of the invention in that the holding strips of the holding disks or sleeves are radially held by covering projections or webs of the neighboring claw poles.

When necessary in order to increase the stability, the holder can be connected with the pole plates and/or the claw poles by welding.

A further increase of the stability is achieved when the free ends of the holding strips are welded correspondingly with the associated holding disks or holding sleeves, or the tips of the claw poles are welded with the associated holding disks.

The permanent magnets at the side which faces the central axis of the machine are fixedly connected with the holding strips. Therefore the sufficient hold on the holding disks or the holding sleeves is provided and they are accurately positioned.

The permanent magnets can be assembled of several layers. The layers can have different strengths. The permanent magnets can be distributed in a different way. For example it is recommended that a holding strip in a longitudinal direction of the free space carries a single throughgoing, one-piece permanent magnet, or a holding strip in the longitudinal direction of the free space carries two or more permanent magnets, or a holding strip in a peripheral direction of the free space carries two or more permanent magnets which can be composed of several layers.

Additional ventilating vanes on the rotor can be dispensed with, when in accordance with another embodiment of the present invention, the holding disks or holding sleeves are provided with ventilating vanes. The ventilating vanes are stamped on the holding disks or the holding sleeves, they are bent and project from the corresponding element. A further simplification is provided during the use of the holding rings when the holding rings are formed on the holding disks or the holding sleeves.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
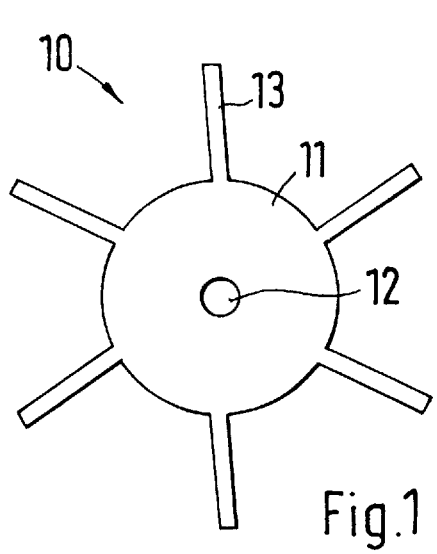
FIGS. 1 and 2 show a plan view of both stamped parts with opposite inclination of ray fingers for a holder of FIG. 3 of a synchronous machine in accordance with the present invention.
Figure 2:
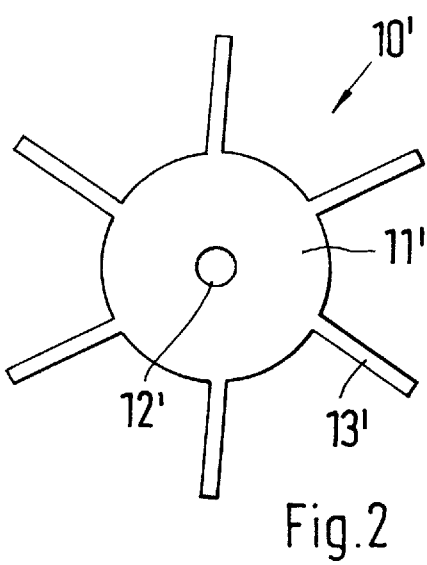

A holder of an inventive synchronous machine shown in FIGS. 1 and 2 in accordance with a first embodiment is composed of two parts which can be produced in a first working step as punched or stamped parts 10 and 10'. The pole plates carry claw poles which are inclined relative to the pole tips. The ray finger 13 and 13' extend not radially but instead inclined in the same clockwise direction in correspondence with the claw angle. The stamped parts 10 and 10' are provided centrally with openings 12 and 12' for the rotor shaft. The holding disks 11 and 11' are formed of one piece with the ray fingers 13 and 13'. The stamped parts 10 and 10' are identical. For bending of the ray fingers which serve as holding strips 13 and 13', the stamped parts 10 and 10' are inserted in a bending mold oppositely.

Figure 3:
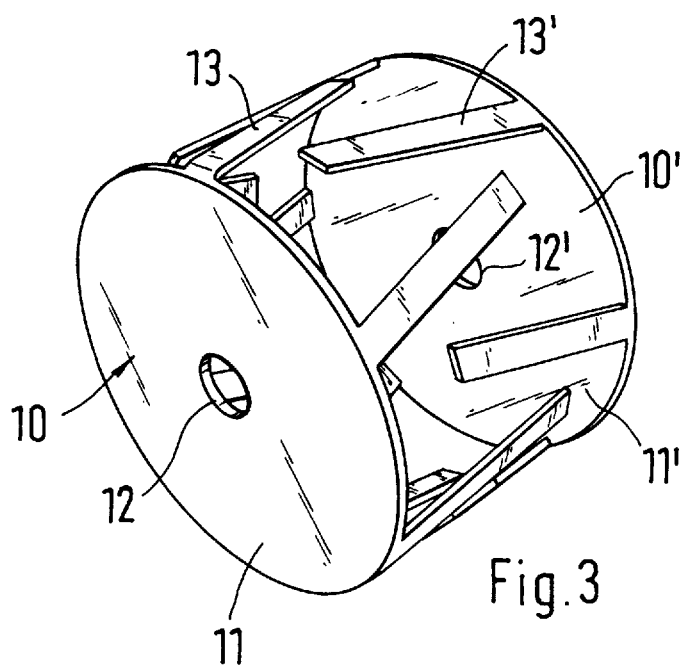
FIG. 3 is a view showing both holding disks with bent holding strips in a mounting position of the inventive machine.

FIG. 3 shows two holding disks 11 and 11' which are required for a holder. They are provided with the holding sleeves 13 and 13' which are oriented opposite to one another in the mounting direction and nested in one another. Therefore between the neighboring holding sleeve 13 and 13', alternatingly a receptacle for a claw pole for one or the other pole plate is produced.

Figure 6:
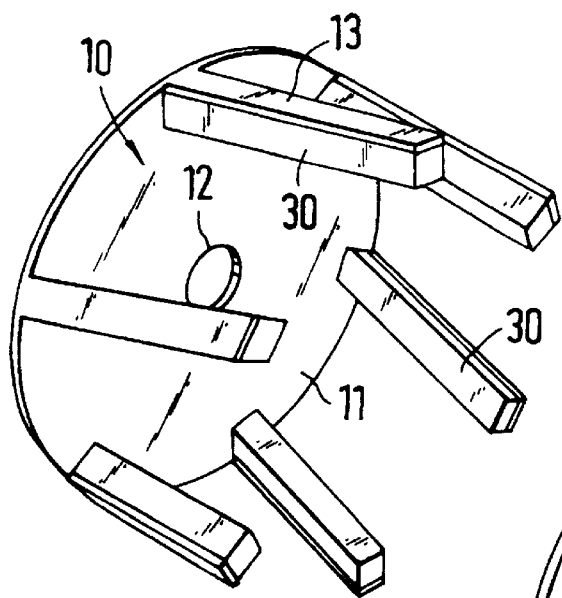
FIG. 6 is a perspective view of the holding disk with a permanent magnet formed of one-piece and fixed on the holding strip of the inventive machine.
Figure 7:
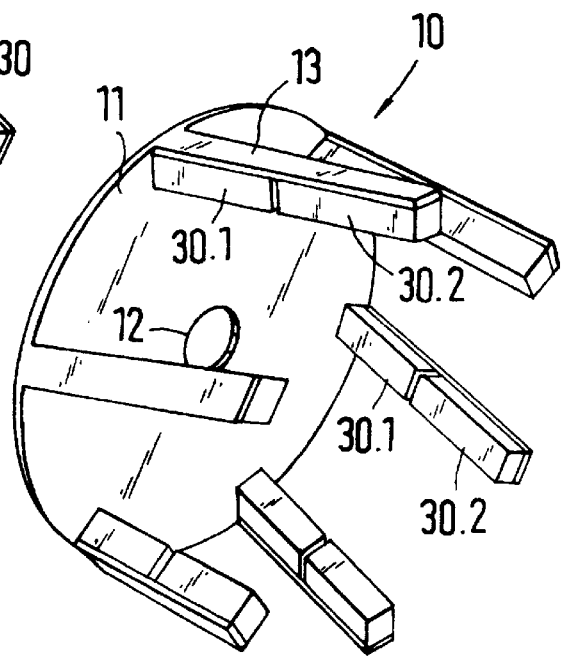
FIG. 7 is a perspective view of the holding disk, in which two permanent magnets are fixed in one another on each holding strip.

As shown in FIG. 6 and 7, permanent magnets 30 or 30.1 and 30.2 are fixedly mounted on the holding strips 13, for example by adhesive. An one-piece permanent magnet 30 can extend over the whole length of the holding strip 13. Two or more permanent magnets 30.1 or 30.2 can be arranged one after the other. The permanent magnets are always arranged at the side of the holding strip 13 which is opposite to the central axis of the machine. The holding disk 11 and 11' form the prefabricated units which are connected with the pole plates.

Figure 4:
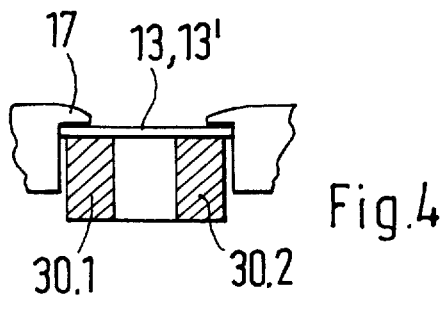
FIGS. 4 and 5 are partial sections showing two variants for a radial support of the holding strips of the inventive machine.
Figure 5:
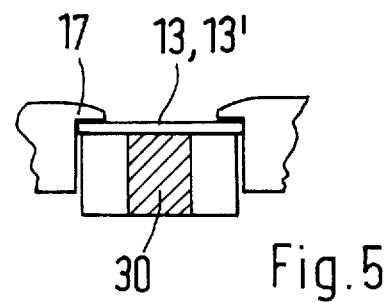
Figure 8:
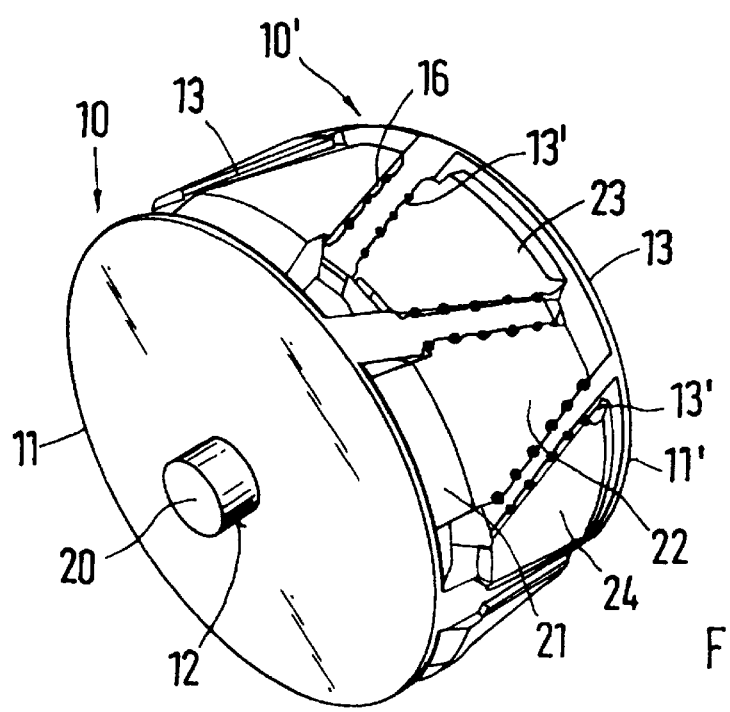
FIG. 8 is a perspective view of a finally mounted rotor with two hold disks of the inventive machine.

The holding disks 11 and 11 ' are fitted from the outer end sides of the pole plates on them, and the holding strips 13 come to abutment with the claw poles at one side. The claw poles carry projections 17 or webs which radially support the holding strips 13. In particular, they partially overlap the holding strips, as can be seen from the section of FIGS. 4 and 5. The holding strips 14 can be provided also with one or two permanent magnets 30 or 30.1 and 30.2 extending transversely to its longitudinal direction. The fixation of the holding strips 13 on the free longitudinal sides is performed during plugging of both pole plates through the claw poles of the corresponding other pole plate. As can be seen from FIG. 8, claw poles 22 and 24 of the pole plates 21 and 23, and also the holding strip 13 and 13' of both holding disks 11 and 11' alternate in the peripheral direction. By forming the claw poles, after mounting of the rotor, projections 17 can be formed. They support the holding strips 13 and 13' radially against the centrifugal forces. The holding strips 11 and 11' can be fixed on the rotor shaft 20 as shown in FIG. 9.

When the holding disks 11 and 11' with the holding strips 13 and 13' are composed of non-ferromagnetic weldable material, such as for example high grade steel, brass, bronze, or aluminum, the holding strips 13 and 13' with the neighboring claw poles 22 and 24 can be additionally welded. Thereby the stability of the holder is further increased. The claw tips can be welded with the facing holding disks 11' or 11 or the pole plates 24 or 22, when the holding strips over the whole axial sides of the holder.

Figure 9:
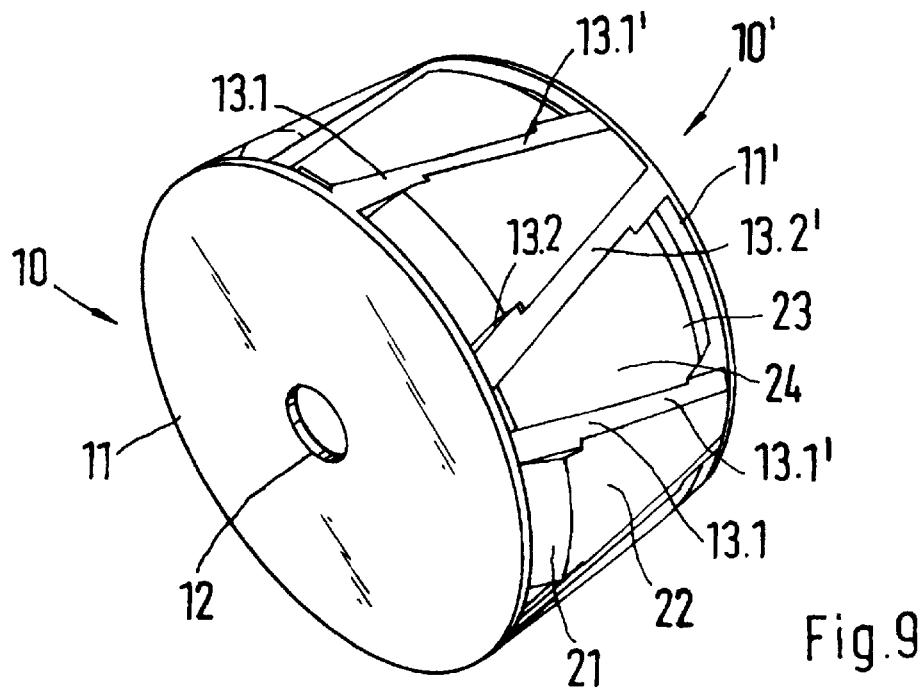
FIG. 9 is a perspective view of a finally mounted rotor with two holding sleeves of the inventive machine.
Figure 10:
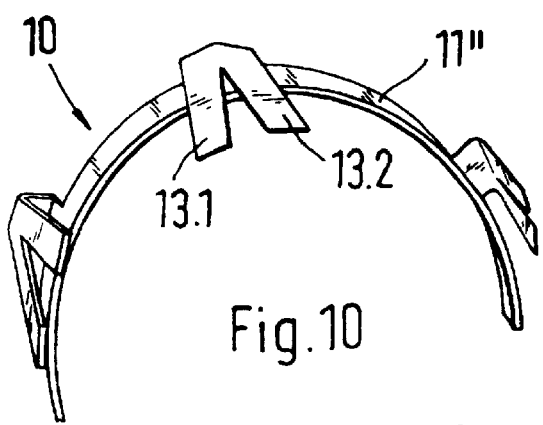
FIG. 10 is a partial view of a holding sleeve for the rotor in accordance with FIG. 9 with pairs of the holding strip of the inventive machine.
Figure 12:
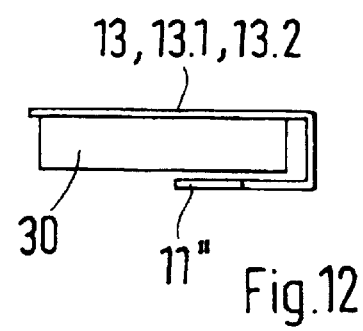
FIG. 12 is a partial view which illustrates a bending of the holding strip on the holding disk of the inventive machine.

Holding sleeves 11" shown in FIG. 10 can be also utilized with the rotor of the pole plates with reducing claw poles 22 and 23 of FIG. 9. The pairs of holding strips 13.1 and 13.2 are inclined in correspondence with the inclination of the free spaces between the claw poles 22 and 23. They are formed on the holding sleeve 11 and bent as shown in FIG. 12. The holding sleeves 11" are formed so that they can be plugged from the claw side on the pole plates 21 and 23, and the claw poles are inserted each between the pair of the holding sleeves 13.1 and 13.2. The claw poles 22 and 24 extend with their tip regions between the free ends of the holding disks 13.1 and 13.2 since they extend only substantially to the axial center of the excitation system, when the pole plates are mounted on the excitation system. The projecting tip regions of the claw poles have a sufficient space between both holding strips 13.1 and 13.2 of the pair of the pole plates 23 and 21 as shown in FIG. 9. The pair of the holding sleeves 13.1 and 13.2 are formed however on the holding disks 11 and 11' and bent. With the holding sleeves 11" of FIG. 10, the same peripheral distribution of the holding strips 13.1 and 13.2 or 13.1' and 13.2" is provided, as can be seen from FIG. 9.

Figure 11:
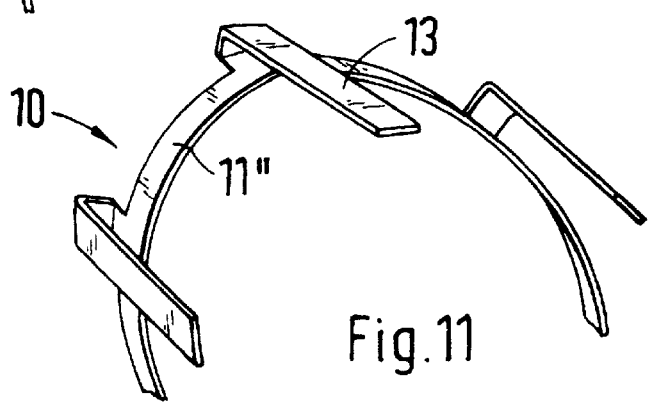
FIG. 11 is a partial view of a holding sleeve with individual holding strips which extend parallel or inclined to a central axis of the machine.

As can be seen from FIG. 11, showing the holding sleeve 11', individual holding strips 13 can be formed on the holding sleeve and bent as receptacles for the permanent magnet 30. The holding strip 13 can extend over the whole axial size of the free space, with the free spaces between the claw poles 22 and 23 extending parallel to the central axis of the machine. Therefore, only a single holding sleeve 11' is needed as a holder. The holding strips 13 must be formed and bent on the holding sleeve 11' in correspondence with the number of poles.

Two holding sleeves 11" can be used as the holder, when the holding strip 13 extend only to the center of the excitation system. Each holding sleeve 11' has a number of holding strips 13 which corresponds to the number of poles.

When the holding sleeves 13 extend over the whole axial size of the free spaces, two identical holding sleeves 11 can be used as FIG. 11. In this case the number of the holding strips 13 corresponds to the half number of the poles.

Figure 13:
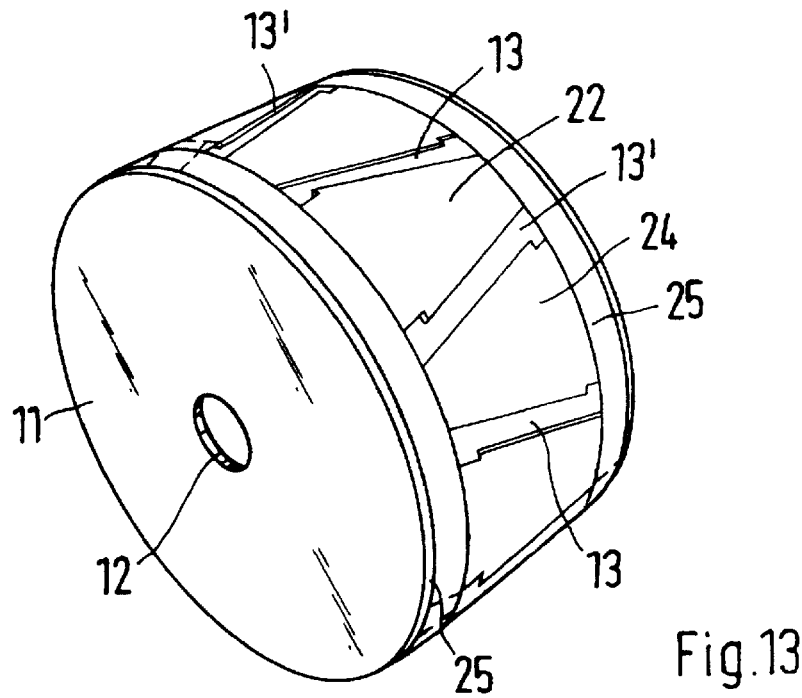
FIG. 13 is a view showing a rotor in which the claw tips are oriented by additional holding ring against centrifugal forces.
Figure 14:
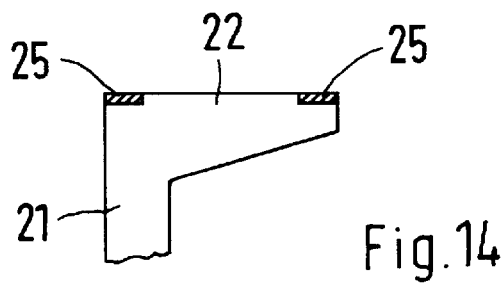
FIG. 14 is a partial view with the claw tip and the holder of the inventive machine.

As shown in FIG. 13, the rotor can be also provided with the holding disks 11 and 11' which are oriented in the region of the pole plates 21 and 23 with additional holders 25 and 25' radially against the centrifugal forces. The claw tips can carry peripherally recesses which receive the holder 25 in a flush manner as in FIG. 14.

Figure 15:
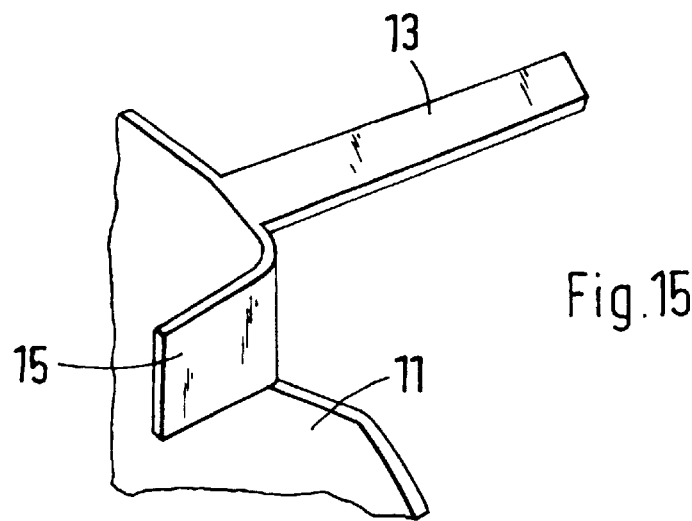
FIG. 15 is a partial view of the holding disk with the stamped and bent ventilating vanes.

Ventilating vanes 15 can be stamped additionally on the holding disks and bent as shown in FIG. 15. The holding disks 11 therefore perform another function. A separate ventilating vane wheel is therefore no longer needed.

For providing the holding strips with permanent magnets and their fixation on the claw poles or pole plates, the same is applicable for the use of the holding sleeve 11 " as with the use of the holding disks 11 and 11'.

It will be understood that each of the elements described above, or two or more together, may also find a useful application in other types of constructions differing from the types described above.

While the invention has been illustrated and described as embodied in synchronous machine, in particular generator for motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

We claim:

1. A synchronous machine formed as a generator for a motor vehicle; comprising a rotor; an excitation system comprising a plurality of electrically excited individual poles in said rotor formed as claw poles excited by a common excitation coil; pole plates arranged on axial ends of said rotor; permanent magnets provided for compensation of a magnetic stray flux in free spaces between said claw poles; a holder which supports said permanent magnets against centrifugal forces, said holder being composed of two non magnetic holding disks which are arranged at axial ends of said excitation system at outer sides of said pole plates, said holding disks being provided with formed and bent holding strips, and said holding disks being alternatingly inserted with said holding strips in the free spaces between said claw poles.

2. A synchronous machine as defined in claim 1, wherein said holding disks are provided in a number corresponding to a half number of poles and extending on said holding disks parallel to one another.

3. A synchronous machine as defined in claim 1, wherein said holding disks are provided in a number corresponding to a half number of poles and extending on said holding disks inclined in a same direction.

4. A synchronous machine as defined in claim 1, wherein neighboring ones of said claw poles are provided with elements selected from the group consisting of projections and webs, said holding strips of said holding disks being radially held by said elements.

5. A synchronous machine as defined in claim 1, wherein said claw poles are provided with grooves, said holding strips of said holding disks being inserted in said grooves of said claw poles.

6. A synchronous machine as defined in claim 4, wherein said projections are formed as parts of claw walls which are deformed after insertion of said holding strips.

7. A synchronous machine as defined in claim 1, wherein said holding disks with said holding strips are formed as stamped bending parts of a non-ferromagnetic weldable material.

8. A synchronous machine as defined in claim 7, wherein said holding strips are welded with neighboring ones of said claw poles.

9. A synchronous machine as defined in claim 8, wherein said holding strips have free ends which are welded with facing ones of said holding disks.

10. A synchronous machine as defined in claim 1, wherein said claw poles have tips which are welded with facing ones of said holding disks.

11. A synchronous machine as defined in claim 1, wherein said permanent magnets at a side of said holding strips which faces a central axis of the machine are fixedly connected with said holding strips.

12. A synchronous machine as defined in claim 1, wherein one of said holding strips supports a single, throughgoing one-piece permanent magnet in a longitudinal direction of said free spaces.

13. A synchronous machine as defined in claim 1, wherein one of said holding strips supports in a longitudinal direction of said free spaces at least two of said permanent magnets.

14. A synchronous machine as defined in claim 1, wherein said holding strips in a peripheral direction of said free spaces carry at least two of said permanent magnets.

15. A synchronous machine as defined in claim 1, wherein said permanent magnets are subdivided into several layers.

16. A synchronous machine as defined in claim 1, wherein said holding disks are provided with stamped projecting bent ventilating vanes.

17. A synchronous machine as defined in claim 1; and further comprising holding rings which support tips of said claws against centrifugal forces.

18. A synchronous machine as defined in claim 17, wherein said holding rings are formed on said holding disks.

19. A synchronous machine formed as a generator for a motor vehicle; comprising a rotor; an excitation system comprising a plurality of electrically excited individual poles in said rotor formed as claw poles excited by a common excitation coil; pole plates arranged on axial ends of said rotor; permanent magnets provided for compensation of a magnetic stray flux in free spaces between said claw poles; a holder which supports said permanent magnets against centrifugal forces, said holder being composed of two non-magnetic holding sleeves which are arranged under said claw poles of associated ones of said pole plates and provided with formed-bent holding strips inserted in the free spaces between said claw poles, said holding strips supporting said permanent magnet against centrifugal forces, said holding strips being held on a neighboring ones of said claw poles.

20. A synchronous machine as defined in claim 19, wherein said holding strips are formed alternatingly on one or another of said holding sleeves and bent, and extend over a whole axial size of said free spaces parallel to a central axis of the machine.

21. A synchronous machine as defined in claim 1, wherein said holding disks are provided in a number corresponding to a half number of poles and extending on said holding disks inclined to one another.

22. A synchronous machine as defined in claim 19, wherein said holding strips are formed on said holding sleeves as pairs inclined at a claw angle, so as to extend substantially to an axial center of said excitation system and to fill pairs of said free spaces, to abut against one another in a region of associated axial ends of said excitation system.

23. A synchronous machine as defined in claim 1, wherein neighboring ones of said claw poles are provided with elements selected from the group consisting of projections and webs, said holding strips of said holding sleeves being radially held by said elements.

24. A synchronous machine as defined in claim 1, wherein said claw poles are provided with grooves, said holding strips of said holding sleeves being inserted in said grooves of said claw poles.

25. A synchronous machine as defined in claim 23, wherein said projections are formed as parts of claw walls which are deformed after insertion of said holding strips.

26. A synchronous machine as defined in claim 1, wherein said holding sleeves with said holding strips are formed as stamped bending parts of a non-ferromagnetic weldable material.

27. A synchronous machine as defined in claim 26, wherein said holding strips are welded with neighboring ones of said claw poles.

28. A synchronous machine as defined in claim 19, wherein said claw poles have tips which are welded with facing ones of said holding sleeves.

29. A synchronous machine as defined in claim 19, wherein said permanent magnets at a side of said holding strips which faces a central axis of the machine are fixedly connected with said holding strips.

30. A synchronous machine as defined in claim 19, wherein said claw poles have tips which are welded with facing ones of said holding disks.

31. A synchronous machine as defined in claim 19, wherein one of said holding strips supports in a longitudinal direction of said free spaces at least two of said permanent magnets.

32. A synchronous machine as defined in claim 19, wherein said holding strips in a peripheral direction of said free spaces carry at least two of said permanent magnets.

33. A synchronous machine as defined in claim 19, wherein said permanent magnets are subdivided into several layers.

34. A synchronous machine as defined in claim 19, wherein said holding sleeves are provided with stamped projecting bent ventilating vanes.

35. A synchronous machine as defined in claim 19; and further comprising holding rings which support tips of said claws against centrifugal forces.

36. A synchronous machine as defined in claim 35, wherein said holding rings are formed on said holding sleeves.

* * * * *